United States Patent [19]

Stecklein

[11] 4,190,378
[45] Feb. 26, 1980

[54] ARTICULATED JOINT INCLUDING BELLEVILLE SPRING SEALS MAINTAINED IN PRESELECTED COMPRESSED STATE

[75] Inventor: Gary L. Stecklein, Dubuque, Iowa
[73] Assignee: Deere & Company, Moline, Ill.
[21] Appl. No.: 20,695
[22] Filed: Mar. 15, 1979
[51] Int. Cl.² .................... F16C 11/00; F16D 1/12
[52] U.S. Cl. ............................ 403/146; 403/161; 403/159; 403/290
[58] Field of Search ............ 403/146, 149, 154–159, 403/161, 162, 79, 408, 379, 290; 305/11; 172/311, 349, 350, 456, 651, 652, 662, 742

[56] References Cited

U.S. PATENT DOCUMENTS

| | | | |
|---|---|---|---|
| 2,531,326 | 11/1950 | DiPaolo et al. | 403/161 X |
| 2,838,331 | 6/1958 | Coleman | 403/146 |
| 3,050,346 | 8/1962 | Simpson et al. | 305/11 |
| 3,110,097 | 11/1963 | Yocum | 305/11 UX |
| 3,979,994 | 9/1976 | Collignon | 403/156 X |
| 4,004,855 | 1/1977 | Stecklein | 403/158 |
| 4,018,104 | 4/1977 | Bland et al. | 403/146 X |
| 4,096,957 | 6/1978 | Iverson et al. | 403/157 X |

*Primary Examiner*—Wayne L. Shedd

[57] ABSTRACT

A yoke-type pivot joint includes a first member having a pair of parallel portions provided with holes which are axially aligned with each other and with a hole provided in a second member located between the parallel portions. A bushing is press fit into the hole in the second member and a pin is received in the bushing and in the holes in the parallel portions. First and second pairs of opposed Belleville spring seals are respectively located between the pair of parallel portions and the opposite end of the bushing. The parallel portions contain respective slots extending from the holes therein and fasteners are provided to clamp the slots together to thus clamp the parallel portions on the pin at selected locations for positioning the parallel portions for effecting compression of the Belleville springs.

1 Claim, 2 Drawing Figures

ARTICULATED JOINT INCLUDING BELLEVILLE SPRING SEALS MAINTAINED IN PRESELECTED COMPRESSED STATE

BACKGROUND OF THE INVENTION

The present invention relates to articulated connections and more specifically relates to fixed width, yoke-type joints utilizing opposed pairs of Belleville washers as sealing means.

The use of Belleville springs as seals in fixed width, yoke-type joints has had limited use primarily because of the difficulty involved in assembling the joint while maintaining the desired amount of washer deflection.

U.S. Pat. No. 4,004,855 issued to the applicant of the instant application on Jan. 25, 1977, represents one solution to the problems of assembly and spring compression maintenance. In the patented structure, a first member includes a pair of parallel portions located on the opposite sides of a second member. The parallel portions and the second member are provided with aligned holes, and a bushing shorter than the length of the hole in the second member is received therein. Located on the pin at the opposite ends of the bushing are first and second pairs of opposed Belleville springs which, when uncompressed, have a length greater than the difference between the length of the bushing and that of the hole in the second member. A pair of adjustable width wedge assemblies are respectively mounted to the pair of parallel portions between the latter and the opposite sides of the second member for the purpose of compressing the sets of Belleville springs into the hole in the second member. The wedge pieces have the disadvantage of complicating the manufacture and thus unduly increasing the cost of the joint assemblies.

SUMMARY OF THE INVENTION

According to the present invention, there is provided a novel manner of constructing fixed width, yoke-type pivot joints including Belleville springs acting as seals and, more specifically, there is provided simple means for maintaining the Belleville springs properly compressed for efficient sealing.

Another object of the invention is to provide the parallel portions of the first member with slots extending to the holes thereof and to provide fasteners for closing the slots such that the parallel portions may be clamped upon the pivot pin at selected positions conducive for effecting predetermined compression of the Belleville spring seals.

These and other objects will become apparent from a reading of the ensuing description together with the appended drawing.

DESCRIPTION OF THE PREFERRED EMBODIMENT

Figure 1:
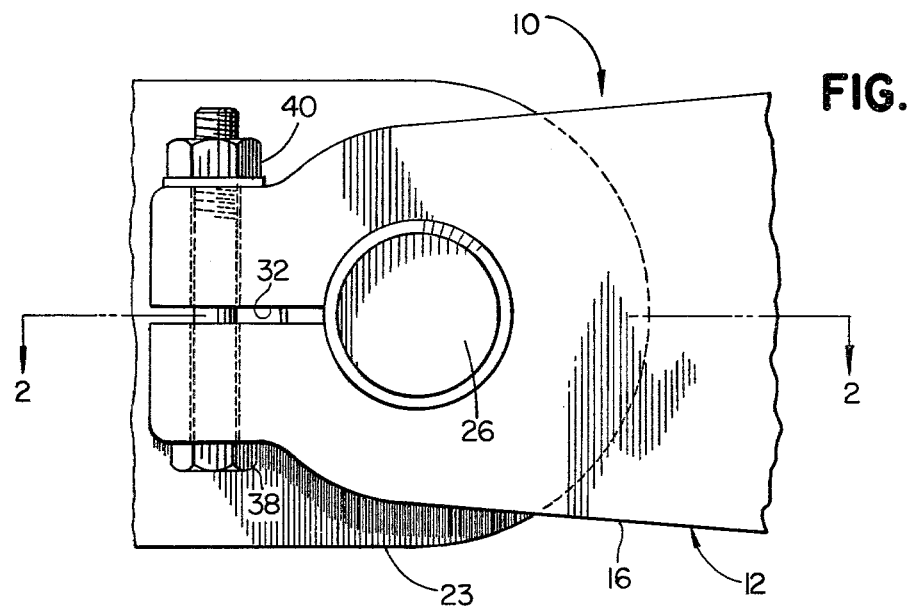
FIG. 1 is an end view of a pivot assembly constructed in accordance with the principles of the invention.
Figure 2:
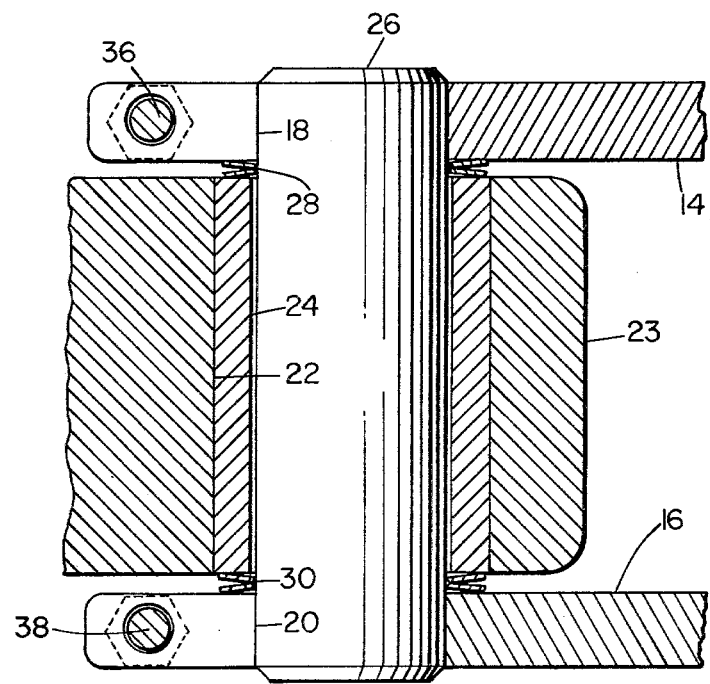
FIG. 2 is a longitudinal sectional view taken on line 2—2 of FIG. 1.

Referring to the drawing, therein is shown a fixed width, yoke-type pivot assembly 10 comprising a first member 12 having a pair of right and left parallel portions 14 and 16 respectively provided with holes 18 and 20 aligned with each other and with a hole 22 provided in a second member located between the portions 14 and 16. A bushing 24 is press fit into the hole 22 and a pin 26 is received in the bushing and in the holes 18 and 20. A right pair of opposed Belleville springs 28 is received on the pin 26 between the right portion 14 and the right end of the bushing 24 while a left pair of springs 30 is received on the pin between the left portion 16 and the left end of the bushing 24. The ends of the right and left portions 14 and 16 are split such as to form respective slots 32 and 34 which extend to the holes 18 and 20 and provided in the portions 14 and 16 in crosswise intersecting relationship to the slots 32 and 34 are bolts 36 and 38 having nuts 40 and 42 threaded on the ends thereof and respectively operative to clamp the portions 14 and 16 at desired locations along the pin 26 for ensuing a preselected compression of the pairs of Belleville spring 28 and 30 against the opposite ends of the bushing 24.

Thus, it will be appreciated that by making the parallel portions of the first member capable of being clamped at desired locations on the pivot pin, a simple means is provided for ensuring that the Belleville spring seals are adequately compressed for efficient sealing.

I claim:

1. In an articulated connection between first and second members, the first member including a pair of parallel portions disposed on opposite sides of and pivotally interconnected to the second member by a pivot pin assembly including aligned holes in the pair of parallel portions and the second member, a bushing received in the hole of the second member and first and second pairs of opposed Belleville springs respectively located on the pin at opposite ends of the bushings, the improvement comprising:

said pair of parallel portions, each including releasable clamp means for releasably clamping the pin in the holes thereof whereby the parallel portions may be clamped to the pin so as to be at a preselected distance from each other to thereby effect a preselected compression of the first and second pairs of Belleville springs.

* * * * *